United States Patent [19]
Whitley

[11] 3,992,043
[45] Nov. 16, 1976

[54] TUBE FITTING
[75] Inventor: Robert K. Whitley, Pasadena, Calif.
[73] Assignee: E. I. Du Pont de Nemours and Company, Wilmington, Del.
[22] Filed: Jan. 16, 1975
[21] Appl. No.: 541,380

[52] U.S. Cl. ............................... 285/39; 285/328; 285/342; 285/354; 285/369; 285/423
[51] Int. Cl.² ......................................... F16L 35/00
[58] Field of Search .......... 285/341, 342, 343, 354, 285/348, 382.7, 328, 116, 386, 423, 356; 151/37

[56] References Cited
UNITED STATES PATENTS

| | | | |
|---|---|---|---|
| 958,927 | 5/1910 | Kelly | 285/328 X |
| 2,343,922 | 3/1944 | Porker | 285/342 X |
| 2,349,180 | 5/1944 | Lamont | 284/342 X |
| 2,394,351 | 2/1946 | Wurzburger | 285/382.7 X |
| 3,188,122 | 6/1965 | Smith | 285/342 X |

*Primary Examiner*—Dave W. Arola

[57] ABSTRACT

Disclosed herein is an improved tube fitting of the swage variety which employs a body part, at least one ferrule designed to slip around a tube, and a nut used to compress the ferrule against the tube and the body part and thereby form a leak-tight connection between the tube and the body part. The nut is divided into two parts which are movably interconnected by a radially flanged tubular portion of one of the nut parts. This flanged tubular portion engages the ferrule and prevents rotation of the ferrule while it is being compressed against the body part by rotation of the other nut part.

6 Claims, 5 Drawing Figures

TUBE FITTING

BACKGROUND OF THE INVENTION

1. Field of the Invention

This invention relates to a tube fitting and more particularly to a tube fitting suitable for use in both pressure and vacuum applications.

2. Discussion of the Prior Art

Tube fittings of the swage variety, such as those manufactured by the Crawford Fitting Company under the tradename Swagelok and the Parker Hannifin Company under the tradename Parker CPI, have been used for many years to connect various types of tubing, including glass tubing, to other structures. These fittings are widely used in scientific and commercial applications where either high pressure or vacuum are involved. With moderate pressure applied by a nut to a ferrule carried by the tube, a reasonable leak-tight fitting between the tube and the structure can be obtained. However, the friction between the nut and the ferrule tends to rotate the ferrule as the nut is tightened, and the friction between the ferrule and the tube tends to rotate the tube as well. Under some circumstances, this does not present much of a problem, but in rigid systems, particularly fragile systems such as those composed of glass, any rotation of the tube as the nut is tightened introduces stress into the system. In extreme cases, this can cause fracture of the glass.

It has now been found that a simple modification to the nut utilized with the swage fitting will reduce the possibility of such fracture by immobilizing the ferrule as the nut is turned.

SUMMARY OF THE INVENTION

This is accomplished in a tube fitting comprising at least one cylindrically-shaped ferrule with a tapered end and an abutment end; a body part having an externally threaded cylindrical extension and an internal channel with an axis passing through the extension, the channel terminating at an end of the extension in a frustroconically-shaped mouth which engages the tapered end of the ferrule; and a nut having an internally threaded wall defining a cavity containing the ferrule and being in threaded engagement with the extension of the body part. The ferrule and the nut have channels running through them with axes concentric with the axis of the channel in the extension of the body part. The nut is constructed of two movably interconnected parts, a first nut part, as described above, and a second nut part comprising a thin tubular portion passing through the channel in the first nut part into the cavity. The thin tubular portion has a radially flared end within the cavity to prevent dissociation of the two nut parts while allowing rotation of the first nut part relative to the second nut part around the axis of the channels in the nut parts. The flared end of the thin tubular portion is in contact with the ferrule.

In a preferred embodiment, the flared end of the tubular portion is roughened or serrated on the surface adjacent to the ferrule to aid in immobilizing the ferrule.

The tube fitting can be one which is designed to connect two tubes. In such an embodiment, the body part has two concentric cylindrical extensions, and at least two ferrules and two nuts. One nut and at least one ferrule are associated with each extension. Alternatively, one end of the body part can be either directly connected to the structure of interest, or threaded to connect to the structure of interest. In this embodiment, only a single cylindrical extension with the associated ferrule and nut are provided.

BRIEF DESCRIPTION OF THE DRAWINGS

The present invention is best described by reference to the following figures in which.

DETAILED DESCRIPTION OF THE ONE EMBODIMENT OF THE PRESENT INVENTION

Figure 1:
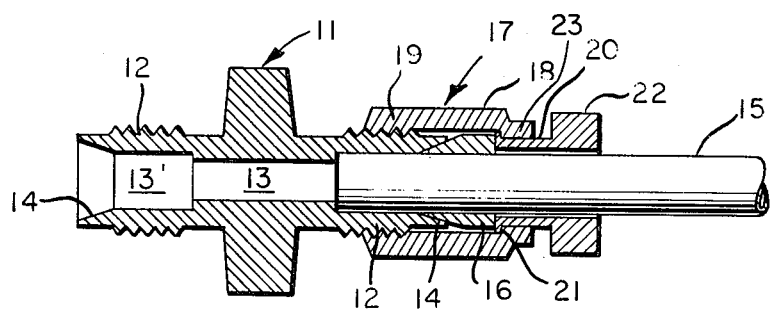
FIG. 1 is a cross sectional side view of one embodiment of the present invention.
Figure 2:
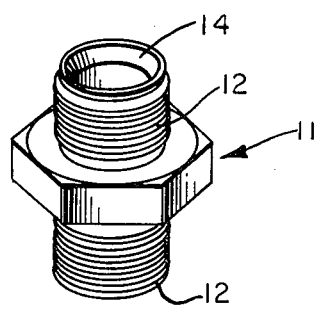
FIG. 2 is a plan view of the body part used in the tube fitting shown in FIG. 1.
Figure 3:
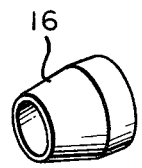
FIG. 3 is a plan view of the ferrule used in the tube fitting of FIG. 1.
Figure 4:
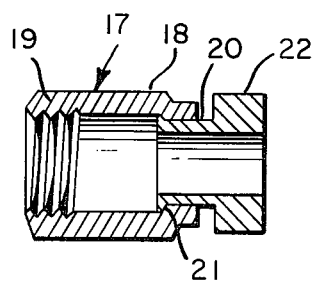
FIG. 4 is a cross sectional view of the nut assembly used in the tube fitting of FIG. 1.
Figure 5:
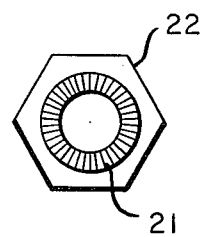
FIG. 5 is a top view of one part of the nut used in the fitting of FIG. 1 showing the flared, serrated end of the nut part which is intended to contact the ferrule.

Referring to the figures, the tube fitting of the present invention comprises a body part 11 with two externally threaded cylindrical extensions 12, and a channel 13 extending straight through the body part and terminating at the end of each extension in a frustroconically-shaped mouth 14. In the embodiment shown, the cylindrical channel running through the body part has a portion 13' of enlarged diameter at the end of each cylindrical extension so that a tube 15 will butt against the annular ridge formed where the two portions of the channel meet. This is a useful refinement, but it is clearly not necessary to the present invention.

At least one cylindrically-shaped ferrule with a tapered end is carried by tube 15. For some uses, more than one ferrule is used at each end of the body part. In the embodiment shown, however, only one ferrule 16 is used. The frustroconically-shaped mouth of the channel in body part 11 engages the tapered end of the ferrule. A nut 17 also surrounds the tube. This nut comprises two movably interconnected parts. The first nut part 18 has a wall with an internally threaded end 19 for engaging the externally threaded cylindrical extension of the main body and an abutment means 23. The portion of the wall between the two ends define a cavity which contains the ferrule. The second nut part 22 comprises a thin tubular portion 20 which passes through a channel in the first nut part into the cavity and has a radially flared end 21 within the cavity. This flared end acts first of all to prevent dissociation of the two nut parts while allowing rotation of the first nut part relative to the second nut part around an axis concentric with the axis of the tube. The flared end of the thin tubular portion is in contact with the ferrule and also acts to prevent rotation of the ferrule when the first nut part is rotated to press the ferrule into contact with the body part. The flared end is roughened on the surface adjacent to the ferrule to aid in gripping the ferrule. In the embodiment shown, the flange has been serrated by the action of a knurling tool.

The body and the nut used in the tube fitting of the present invention can be made from any suitable material well known to those skilled in the art such as aluminum, nickel or even any hard plastic material. Preferably, however, they are made from stainless steel. The parts are generally machined, but they can be cast.

The ferrule used in the present invention can be made from any material, well known to those skilled in the art, which is rigid, but deformable enough to form a leaktight bond between the tube and the body part. Suitable ferrules can be formed from polyimide resins such as those sold under the tradename Vespel Fabricated Parts by the E. I. du Pont de Nemours and Company, Inc.

In the embodiment shown, the body part 11 and the first nut part 18 are formed from a Swagelok one-fourth inch (0.632 cm.) fitting (No. SS-400-6). The channel in the first nut part was enlarged to 0.297 inch diameter (0.75 cm.), and the second nut part was fabricated out of seven-sixteenths inch (1.12 cm.) stainless steel Hex stock with a 0.265 inch (0.67 cm.) diameter central channel.

In operation, the tube is inserted through the nut and the ferrule into the body part where it butts against the annular ridge formed in the body part by the channels formed therein. The first nut part 18 is then twisted to compress the ferrule against the frustroconical mouth of the body part and thereby compress it against the tube. While the first nut part 18 is being rotated, both the body part 11 and the second nut part 22 are immobilized. For this purpose, the central portion of the body part and the end portion of the second nut part are formed into the shape of a nut which can be grasped by a wrench. As the first nut part 18 is turned, the serrated flange of the second nut part is forced against the exposed end of the ferrule. This has two effects. First of all, it forces the ferrule forward causing the compression discussed above. Second of all, it causes the serrated face of the flange to contact the ferrule. Since the second nut part 22 and the body part 11 are prevented from rotation, the ferrule is also prevented from rotation. Consequently, rotation of the tube is prevented. The second nut part and body part should also be held while disassembling the fitting.

The above description is intended to exemplify only one embodiment of the present invention. A number of modifications apparent to one skilled in the art can be made to the present invention. Such modifications are intended as part of the present invention as described in the following claims.

What is claimed is:

1. In a tube fitting comprising: at least one cylindrically-shaped ferrule with a tapered end and an abutment end; a body part having an externally threaded cylindrical extension and an internal channel terminating at the end of the extension in a frustroconically-shaped mouth which engages the tapered end of said ferrule; and a nut having a wall with an internally threaded portion for engaging the threaded extension of said body part and an abutment means, said wall defining a cavity containing said ferrule and, said ferrule and said nut having channels running through them with axes concentric with the axis of the channel in the extension of said body; the improvement wherein said nut comprises two movably interconnected parts, a first nut part, as described above, and a second nut part comprising a thin tubular portion passing through the channel in said first nut part into the cavity, the end of said thin tubular portion which extends into the cavity being radially flared and being disposed in abutting engagement with the abutment means of said first nut part, the flare having a diameter greater than the diameter of the channel in said first nut part but less than the diameter of the cavity in said first nut part, thereby preventing dissociation of the two nut parts while allowing rotation of the first nut part relative to the second nut part around the axis of the channels in said nut parts, the flared end of the thin tubular portion being in locking contact with the abutment end of said ferrule and the end of the thin tubular portion, opposite said flared end, being provided with tool engaging means thereon.

2. The tube fitting of claim 1 wherein the flared end of said thin tubular portion is roughened on the surface adjacent to the abutment end of said ferrule.

3. The tube fitting of claim 1 wherein the flared end of said thin tubular portion is serrated on the surface adjacent to the abutment end of said ferrule.

4. The tube fitting of claim 1 wherein said body part has two concentric cylindrical extensions and the tube fitting comprises two ferrules and two nuts, one of each being associated with each extension of said body part.

5. The tube fitting of claim 1 wherein said body part and said nut are made from stainless steel.

6. The tube fitting of claim 5 wherein said ferrule is made from a polyimide resin.

* * * * *